US010331315B2

(12) United States Patent
Sripada

(10) Patent No.: US 10,331,315 B2
(45) Date of Patent: *Jun. 25, 2019

(54) 3D USER INTERFACE FOR APPLICATION ENTITIES

(71) Applicant: Microsoft Technology Licensing, LLC, Redmond, WA (US)

(72) Inventor: Nagaraj Sripada, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 691 days.

This patent is subject to a terminal disclaimer.

(21) Appl. No.: 14/726,493

(22) Filed: May 30, 2015

(65) Prior Publication Data

US 2015/0268831 A1 Sep. 24, 2015

Related U.S. Application Data

(63) Continuation of application No. 13/530,737, filed on Jun. 22, 2012, now Pat. No. 9,069,455.

(51) Int. Cl.
*G06F 3/0484* (2013.01)
*G06F 3/01* (2006.01)
(Continued)

(52) U.S. Cl.
CPC .......... *G06F 3/04845* (2013.01); *G06F 3/017* (2013.01); *G06F 3/048* (2013.01);
(Continued)

(58) Field of Classification Search
CPC .................................................. G06F 3/0484
(Continued)

(56) References Cited

U.S. PATENT DOCUMENTS 5,678,015 A * 10/1997 Goh ..................... G06F 3/04815
345/419
8,132,120 B2 3/2012 Stallings et al.
(Continued)

FOREIGN PATENT DOCUMENTS

CN 1494346 A 5/2004
CN 1728066 A 2/2006
(Continued)

OTHER PUBLICATIONS

Screenshot of various features of CoverFlow for Mac OS X by Steelskies, Wayback Machine, available at <http://web.archive.org>, archived on May 13, 2006, 21 pages.*
(Continued)

*Primary Examiner* — Reza Nabi

(57) ABSTRACT

Embodiments relate to three-dimensional user interfaces for managing and accessing applications. Applications are stored on storage of a device. A user interface is displayed on a display. The user interface includes interactively rotatable three-dimensional structures each comprised of regions, each region displaying a graphic representing a corresponding application, the applications activatable by interaction with the three-dimensional structures. Applications can be assigned to structures (volumes) manually or automatically. The three-dimensional structures may be rotated and otherwise manipulated by user input.

20 Claims, 10 Drawing Sheets

(51) Int. Cl.
*G06F 3/0482* (2013.01)
*G06T 19/20* (2011.01)
*G06T 19/00* (2011.01)
*G06F 3/0481* (2013.01)
*G06T 17/00* (2006.01)
*G06F 3/048* (2013.01)
*G06F 3/0488* (2013.01)

(52) U.S. Cl.
CPC .......... *G06F 3/0482* (2013.01); *G06F 3/0488* (2013.01); *G06F 3/04815* (2013.01); *G06F 3/04817* (2013.01); *G06F 3/04842* (2013.01); *G06T 17/00* (2013.01); *G06T 19/00* (2013.01); *G06T 19/003* (2013.01); *G06T 19/20* (2013.01); *G06F 2203/04802* (2013.01); *G06T 2219/2016* (2013.01)

(58) Field of Classification Search
USPC .......................................................... 715/782
See application file for complete search history.

(56) References Cited

U.S. PATENT DOCUMENTS

| | | | | |
|---|---|---|---|---|
| 9,069,455 B2* | 6/2015 | Sripada | .................. | G06F 3/0488 |
| 9,256,289 B2* | 2/2016 | Song | .................. | G06F 3/017 |
| 9,817,570 B2* | 11/2017 | Bostick | .................. | G06F 3/04886 |
| 2001/0032232 A1* | 10/2001 | Zombek | .................. | H04L 1/1635 |
| | | | | 709/201 |
| 2002/0054011 A1* | 5/2002 | Bruneau | .................. | A63F 13/06 |
| | | | | 345/156 |
| 2003/0098887 A1* | 5/2003 | Li | .................. | G06F 3/04895 |
| | | | | 715/809 |
| 2003/0142136 A1* | 7/2003 | Carter | .................. | G06F 3/04815 |
| | | | | 715/782 |
| 2005/0164688 A1* | 7/2005 | Satake | .................. | H04M 1/6041 |
| | | | | 455/418 |
| 2006/0020888 A1* | 1/2006 | Kang | .................. | G06F 3/04815 |
| | | | | 715/708 |
| 2007/0035564 A1* | 2/2007 | Katsuyama | .................. | H04N 1/00408 |
| | | | | 345/649 |
| 2007/0169066 A1* | 7/2007 | Nielsen | .................. | G06F 8/38 |
| | | | | 717/162 |
| 2007/0220308 A1* | 9/2007 | Yeung | .................. | G06F 11/1458 |
| | | | | 714/5.1 |
| 2008/0022228 A1* | 1/2008 | Kwon | .................. | G06F 3/04817 |
| | | | | 715/838 |
| 2008/0122840 A1* | 5/2008 | Falco | .................. | G06T 15/00 |
| | | | | 345/420 |
| 2009/0089692 A1* | 4/2009 | Morris | .................. | G06F 3/0481 |
| | | | | 715/764 |
| 2009/0164945 A1* | 6/2009 | Li | .................. | G06F 3/04842 |
| | | | | 715/849 |
| 2010/0050129 A1* | 2/2010 | Li | .................. | G06F 3/0481 |
| | | | | 715/849 |
| 2010/0064259 A1* | 3/2010 | Alexanderovitc | .... | G06F 1/1626 |
| | | | | 715/852 |
| 2010/0093400 A1* | 4/2010 | Ju | .................. | G06F 3/04817 |
| | | | | 455/566 |
| 2010/0169836 A1* | 7/2010 | Stallings | .................. | G06F 3/04817 |
| | | | | 715/848 |
| 2011/0028168 A1* | 2/2011 | Champlin | .................. | H04L 51/066 |
| | | | | 455/466 |
| 2011/0028187 A1* | 2/2011 | Kelkka | .................. | H04M 3/42068 |
| | | | | 455/567 |
| 2011/0065478 A1* | 3/2011 | Kim | .................. | G06F 3/0481 |
| | | | | 455/566 |
| 2011/0083078 A1* | 4/2011 | Ju | .................. | G06F 3/0481 |
| | | | | 715/738 |
| 2011/0107269 A1* | 5/2011 | Chiu | .................. | G06F 3/0481 |
| | | | | 715/849 |
| 2011/0242102 A1* | 10/2011 | Hess | .................. | B60K 35/00 |
| | | | | 345/419 |
| 2011/0246950 A1* | 10/2011 | Luna | .................. | G06F 3/04815 |
| | | | | 715/848 |
| 2011/0307834 A1* | 12/2011 | Wu | .................. | G06F 3/0481 |
| | | | | 715/836 |
| 2012/0094719 A1* | 4/2012 | Choi | .................. | H04M 1/72566 |
| | | | | 455/566 |
| 2013/0231144 A1* | 9/2013 | Daniel | .................. | H04W 4/12 |
| | | | | 455/466 |
| 2013/0278484 A1* | 10/2013 | Hwang | .................. | G06F 3/1423 |
| | | | | 345/2.3 |
| 2013/0346911 A1* | 12/2013 | Sripada | .................. | G06F 3/0488 |
| | | | | 715/782 |
| 2014/0129990 A1* | 5/2014 | Xin | .................. | G06F 3/017 |
| | | | | 715/849 |
| 2015/0067556 A1* | 3/2015 | Tibrewal | .................. | G06F 16/285 |
| | | | | 715/765 |
| 2015/0268831 A1* | 9/2015 | Sripada | .................. | G06F 3/0488 |
| | | | | 715/849 |
| 2015/0370691 A1* | 12/2015 | Pandey | .................. | G06F 11/3672 |
| | | | | 714/38.1 |

FOREIGN PATENT DOCUMENTS

| | | |
|---|---|---|
| CN | 101369381 A | 2/2009 |
| CN | 101387937 A | 3/2009 |

OTHER PUBLICATIONS

Screenshot of various features of CoverFlow for Mac OS X by Steelskies, Wayback Machine, available at , archived on May 13, 2006, 21 pages.*

"First Office Action and Search Report Received for Chinese Patent Application No. 201310248838.8", dated Jul. 15, 2015, 15 Pages.

"Second Office Action Issued in Chinese Patent Application No. 201310248838.8", dated Feb. 25, 2016, 12 Pages.

* cited by examiner

124

| app ID | tags | user assignment(s) (cube/face ID) | auto assignment(s) (cube/face ID) |
|---|---|---|---|
| 1 | <phone>, <location> | <*> | <1, 3> |
| 1.1 | <settings> | <2.3> | <*> |
| 1.2 |  | <*> | <3.*> |
| 2 | <math>, <media>, <browsing> | <2> | <*> |
| 2.1 | <> | <4.2> | <*> |
| 3 | <rating=3>, <location> | <2,5,8> | <*> |
| ... | ... | ... | ... |
| N | ... | ... | ... |

FIG. 4 user input invoking rotation
(e.g., swipe-left -> rotate left)

3D USER INTERFACE FOR APPLICATION ENTITIES

REFERENCE TO RELATED INVENTION

This is a continuation patent application of application Ser. No. 13/530,737 (allowed), filed Jun. 22, 2012, entitled "3D USER INTERFACE FOR APPLICATION ENTITIES". The aforementioned application is hereby incorporated herein by reference in its originally filed form.

BACKGROUND

To help users manage and access applications installed on computing devices, various types of user interfaces have been devised. Typically, applications are represented by icons. The icons are displayed in folders, screens, and other two-dimensional formats. Often, a user is able to move icons, remove icons, specify icon locations, and so forth. When an application is installed or added to a shell or environment, an icon or graphic for the application is usually placed on a simple basis such as a next available slot in a folder, alphabetical position in a list, a user designated location, etc.

Such user interfaces, sometimes called shells or environments, may lack efficiencies, conveniences, and aesthetics. For example, a two-dimensional graphic shell may display pages of application icons. There may be no hints as to what is near the current page, what pages or elements a represented application may have, or what displayed elements an application may have. Consider also that various navigational operations may be abrupt. For example, to view a next page or set of application icons, an entire new page might be rendered. The newly displayed icons may have little relationship to the previously displayed icons, requiring the user to completely re-orient to the new information. Finally, organization may be limited to laborious manual formation and arrangement of containers such as folders.

Techniques related to three-dimensional user interfaces, in particular in relation to managing and accessing applications on a computing device, are discussed below.

SUMMARY

The following summary is included only to introduce some concepts discussed in the Detailed Description below. This summary is not comprehensive and is not intended to delineate the scope of the claimed subject matter, which is set forth by the claims presented at the end.

Embodiments relate to three-dimensional user interfaces for managing and accessing applications. Applications are stored on storage of a device. A user interface is displayed on a display. The user interface includes interactively rotatable three-dimensional structures each comprised of regions, each region displaying a graphic representing a corresponding application, the applications activatable by interaction with the three-dimensional structures. Applications can be assigned to structures (volumes) manually or automatically. The three-dimensional structure may be rotated and otherwise manipulated by user input.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

FIG. 4 shows an example of metadata.

DETAILED DESCRIPTION

Figure 1:
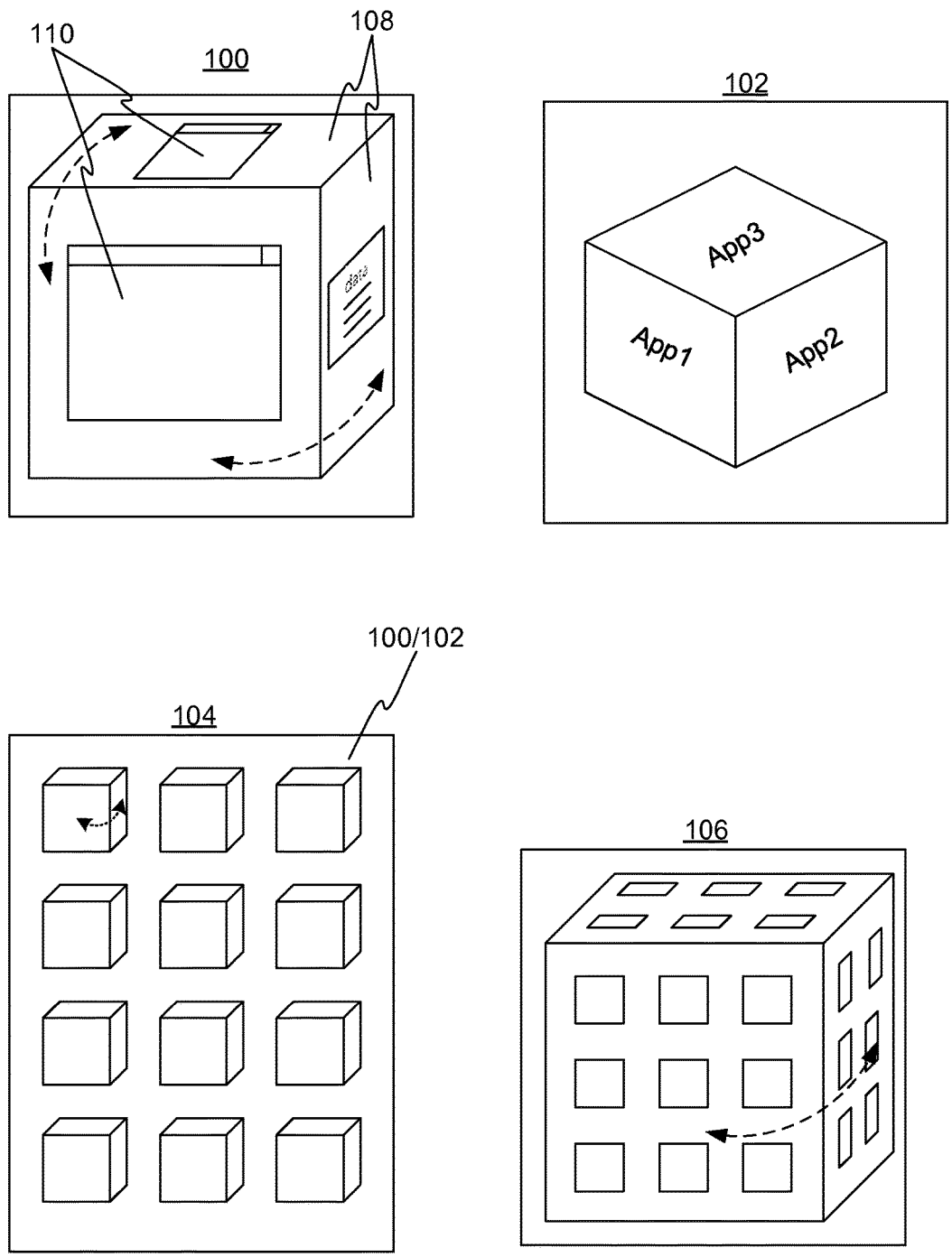
FIG. 1 shows some examples of three-dimensional user interfaces.

FIG. 1 shows some examples of three-dimensional user interfaces 100, 102, 104, 106. A basic concept used herein will be that of a three-dimensional volume with faces. A volume or its faces may correspond to applications or elements (sub-applications) thereof, with appropriate icons or graphic representations displayed thereon. A volume may be any three-dimensional volumetric shape, such as a pyramid, cube, any polyhedron, etc. When displayed, the volume may have graphic faces and edges, or alternatively, transparent or semi-transparent faces and/or edges (or no edges). For instance icons may be arranged to "float" in three-dimensions in positions that correspond to the faces of a dodecahedron, but the actual faces may or may not be shown. A volume may also be a group of planar regions (possibly irregular or asymmetric and bounding a three-dimensional space) that are displayed and manipulated as a single structural unit. With this meaning of "volume" understood, for explanation an example volume—a cube—will be used herein. Where the term "cube" is used, the term "volume" will be considered applicable. In short, the shape and appearance of volumes can vary and is not important to the embodiments described herein.

A first cube 100 is shown in FIG. 1. The first cube 100 has faces 108 displaying icons 110. The dashed arrows indicate the ability of the first cube 100 to be interactively rotated by user input. The box around the first cube 100 represents a window, a face of a containing cube, a display area, a display, etc. The example of first cube 100 is a case where the cube corresponds to a single application, and the icons 110 represent discrete elements of the application. These discrete elements, to be referred to herein as "sub-applications", may be, for example, interface dialogs, documents corresponding to the application, menus, related data (e.g., a call log), configuration settings, etc. For example, if the application is a web browser, one face 108 may contain an icon for a "favorites" set of uniform resource locators (URLs), one face 108 may have an icon representing a main window with tabs for pages, etc.

A second cube 102 in FIG. 1 is an example where faces of a volume contain applications (icons/graphics representing same). The second cube 102 may also be interacted with, rotated, and used as a point to launch the applications represented thereon. As described later with reference to FIG. 10, assuming that the application of the first cube 100 corresponds to an application represented on the second cube 102 (e.g., "App1"), a user may navigate back and forth between the first cube 100 and the second cube 102. An icon for "App1" may be selected by a user on the second cube 102, which causes a graphic transition to the first cube 100. Conversely, a user command may cause the user interface to graphically transition from the first cube 100 to the second cube 102. A transition may involve an animation showing a selected face on a cube moving to occupy the current view, or a de-selected face being supplanted by its cube in the view.

Figure 9:
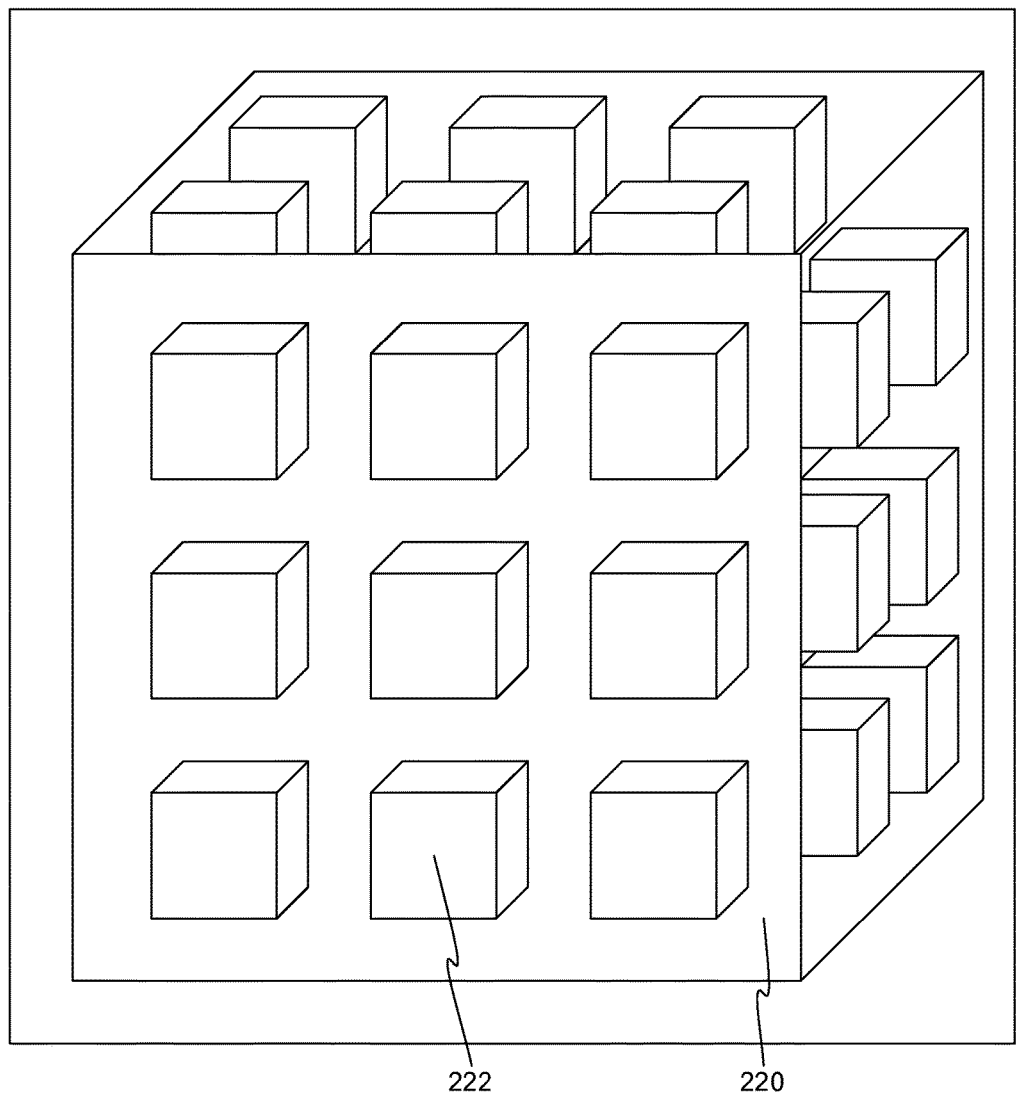
FIG. 9 shows another implementation of the second user interface.

The shell or user interface may also display a higher level composite view of cubes. A first user interface 104 is comprised of cubes which may be similar to the first cube 100 and/or the second cube 102 (or even a cube like that shown in the second user interface 106). As discussed later with reference to FIG. 10, a user may navigate back and forth between the user interface 104 and the first cube 100 (or the second cube 102). When the first cube 100, for example, is selected in the first user interface 104, the user interface transitions graphically from displaying the first user interface 104 to displaying the first cube 100. The user may navigate back to the first user interface 104. Details of the first user interface 104 are discussed below with reference to FIG. 7. In another embodiment, a composite view is itself a cube, as shown by second user interface 106. Note that the icons in the second user interface 106 may instead be volumes, as shown in FIG. 9.

Figure 2:
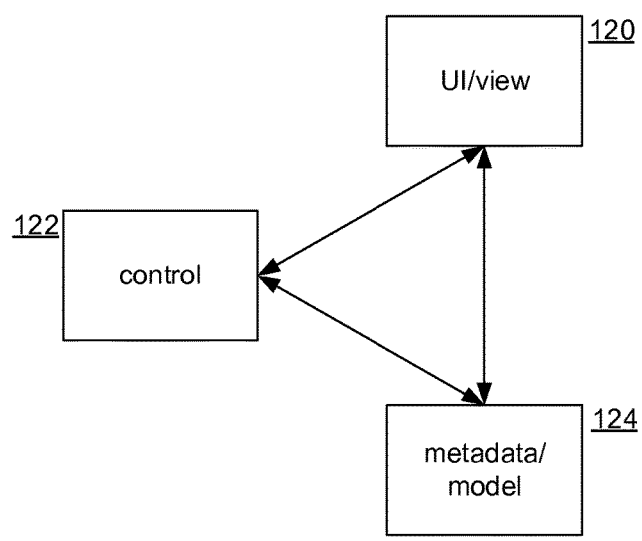
FIG. 2 shows a design that may be used to implement embodiments described herein.

FIG. 2 shows a design that may be used to implement embodiments described herein. Assuming a computing device with a processor, storage, and a display, a user interface 120 (or view) is displayed on the display. A control process 122 is executed by the processor. Metadata 124 (or model) is stored and used by the control process 122. The user interface or view 120 may be any of the embodiments described herein. The control process 122 may perform various functions such has handling user input, implementing user interface logic, managing assignment of applications and sub-applications to cubes and faces, responding to events from user interface elements, and so forth. The metadata 124 may be information about the state and configuration of the user interface or view 120, information about applications, user preferences and settings, etc.

Figure 3:
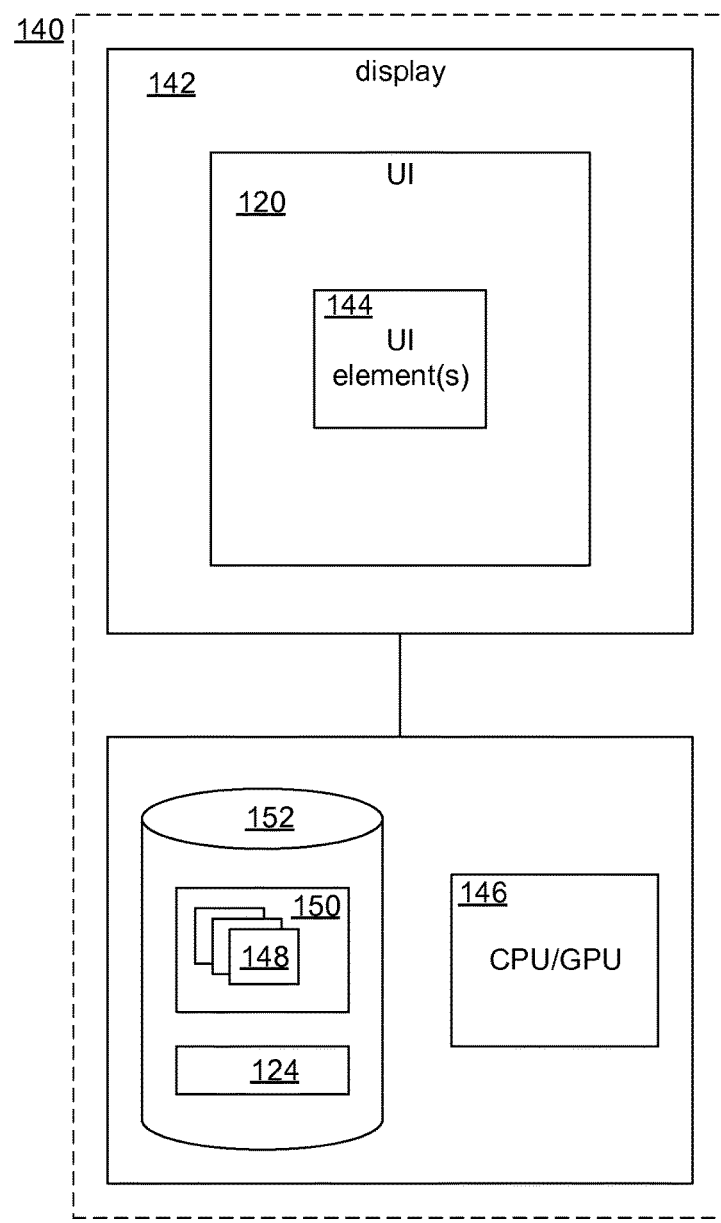
FIG. 3 shows a computing device on which embodiments described herein may be practiced.

FIG. 3 shows a computing device 140 on which embodiments described herein may be practiced. The computing device 140 may have a display 142 on which user interface 120 and user interface elements 144 (e.g., cubes, faces, pop-up menus, animations, buttons, etc.) thereof are displayed. The computing device 140 also has a processor 146 to execute the control process 122 as well as applications 148 installed on an operating system 150. In addition to storing the operating system 150 and applications 148, storage 152 stores the metadata 124.

FIG. 4 shows an example of the metadata 124. While shown in tabular form, the metadata 124 may be stored as a small database, an XML (eXtensible Markup Language) file, serialized objects, etc. The metadata 124 may have identifiers (e.g., "1") to identify applications, as well as identifiers for sub-applications, if any (e.g., "1.1"). An application may be associated with various tags to describe attributes of an application, although attributes and information about an application may be obtained from other sources. Assignment data may indicate which cubes or faces an application or sub-application is associated with. An application or sub-application may have more than one association and may be manually or automatically assigned. Manual assignment may involve indicating a target cube or face when installing an application, dragging an application icon or a copy thereof to a target face or cube, and so forth. When a manual assignment is made a corresponding update is made in the metadata 124.

Automatic assignment can be performed in a number of ways. If a cube or face has one or more tags, applications or sub-applications with matching tags may be assigned accordingly. Some tags may have higher precedence. For example, if there is a cube that is tagged as "photos", applications tagged as or related to "photos" may be assigned to that cube. If an application has no tags, other data may be used for auto-assignment, such as date of installation, which cubes/faces have open space, etc. Note that a user rating may be assigned to an application, and applications may be assigned to be grouped on cubes to reflect the user's preferred applications. In one embodiment, manual user assignments take precedence, and in another embodiment an application is represented on any cube or face to which it is assigned, regardless of whether automatically or manually assigned.

Figure 5:
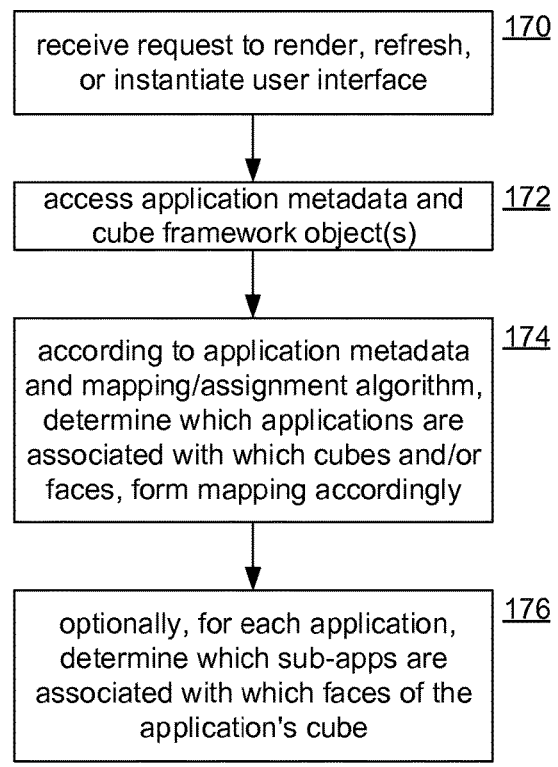
FIG. 5 shows a process for assigning applications and sub-applications to cubes and faces.

FIG. 5 shows a process for assigning applications and sub-applications to cubes and faces. Initially, at step 170, there is a request to render, refresh, or instantiate a three-dimensional user interface. At step 172 the metadata 124 is accessed, as well as information about which applications are installed (application identifiers) and which cubes and faces exist (e.g., a cube framework or software objects). At step 174 the process may perform an algorithm for automatic assignment. Tags and other information about the applications are used for automatic assignment. If sub-applications are used, then at step 176 sub-applications may be similarly assigned to application faces. Automatic assignments may be recorded in the stored metadata 124. When assignments are determined, including possibly ascertaining manual assignments from the metadata, the user interface can be displayed with the cube or cubes having the correspondingly assigned application icons therein.

Figure 6:
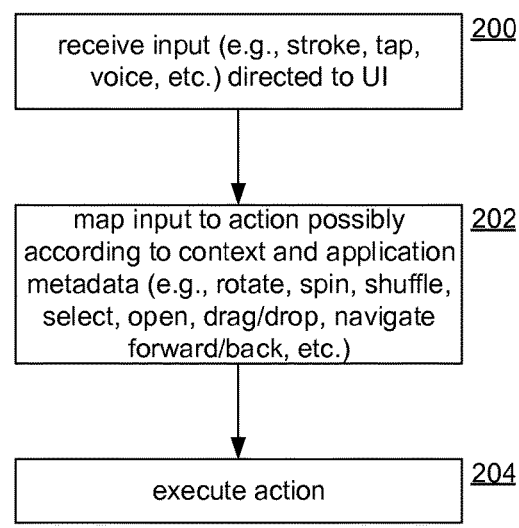
FIG. 6 shows a process for handling interactions with a three-dimensional user interface.

FIG. 6 shows a process for handling interactions with a three-dimensional user interface. At step 200 an input is received, for instance in the form of a stroke, a tap, a voice command, a tilt of the computing device (assuming gyros or accelerometers are present), mouse or button click, etc. At step 202 the input is analyzed according to the current user interface state, and an appropriate action is determined. At step 204 the action is executed.

Example inputs and actions will now be described. Rotation of a cube can be actuated by a tap input; for instance a tap on a corner or edge of a face may cause the cube to rotate in a corresponding plane to bring one or more new faces into view. Rotation may be actuated in directions corresponding to swipes or drags, either in nearest planes or in any arbitrary planes. Rotational direction may be according to a number of fingers swiping regardless of direction, for example, two fingers rotate up-down and three fingers rotate left-right. Any type of inputs may be used.

The user interface may have different input modes. A first input mode may direct user inputs to rotational operations, whereas a second mode may direct user inputs to navigational operations such as selecting a parent or child cube, selecting face, activating an application icon, and so on. A third input may direct user inputs to applications themselves.

The duration of an input may influence the extent of rotation. As a cube rotates it may snap into various predetermined orientations. In one embodiment where multiple faces of a volume are usually or always displayed at one time, a rotation may shift multiple faces out of and into view. In the case of a cube, a user setting or particular input may cause the cube to rotate two times. In another embodiment, the user input invokes a "flip" action that rotates the cube or volume 180 degrees. In the case of a cube, if three faces are displayed at a time, a flip causes the back three faces to become the front three faces. In another embodiment, rotation may be determined in part according to device orientation. In yet another embodiment, a random spin may be invoked (e.g., by shake of a motion-sensing device); the direction or extent of rotation may be random. If multiple cubes are displayed, different cubes may spin in different directions and for different durations (degrees of rotation).

Figure 7:
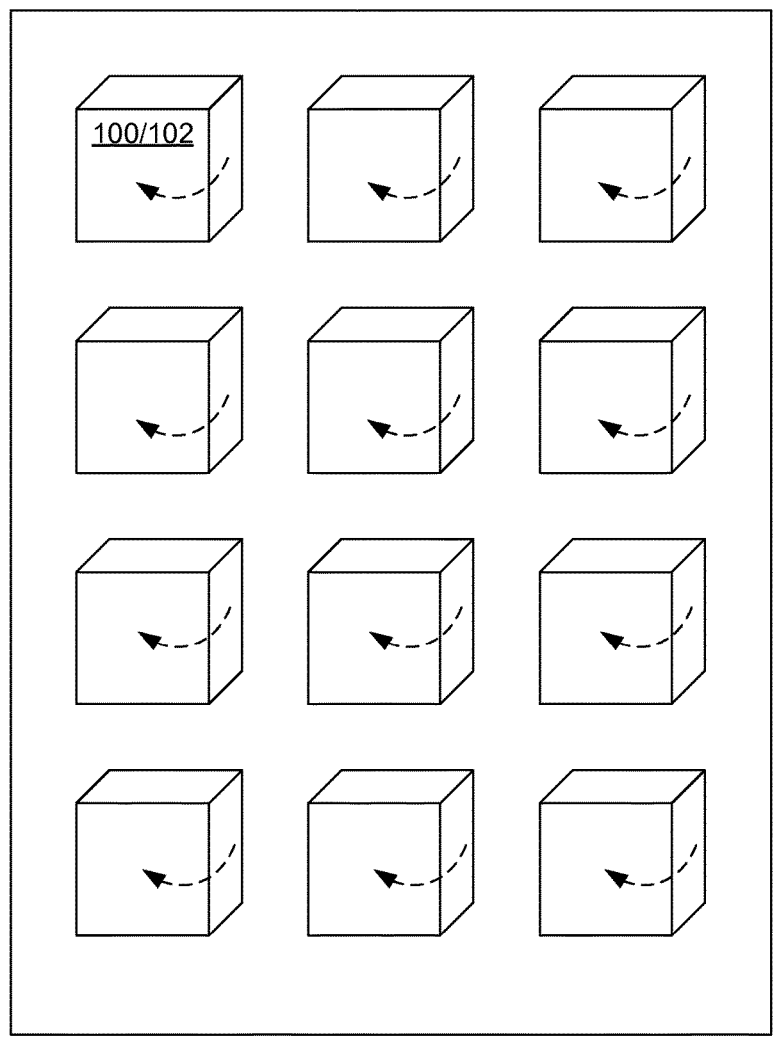
FIG. 7 shows a detailed view of a first user interface.

FIG. 7 shows a detailed view of first user interface 104, which is a composite view of cubes 100/102. The interactions described (e.g., rotations, navigations) above can be applied equally to the user interface 104. That is, the user may manipulate cubes en masse just as an individual cube may be manipulated. For example, if the user provides an input for a "rotate-left" action, all of the cubes 100/102 rotate or swivel left in unison. Alternatively, a user may select a subset of cubes 100/102 to rotate, for instance, by selecting cubes with a designated trait, or tag, by dragging a region of the user interface, etc.

When multiple cubes are displayed, the user interface may allow a user to add new cubes, shuffle cubes, move cubes, duplicate cubes, delete cubes, pin/unpin cubes, and group/ungroup cubes. A search facility may be provided to allow the user to search for applications, in which case cubes may automatically rotate to show faces with applications that match a search. Cubes with matching applications may also be shuffled to the top of the user interface or duplicated onto a results cube.

In one embodiment, a number of applications or sub-applications that can be contained by a face (or cube) will be configurable by the user. Thus, the number of faces that can actively contain applications or sub-applications will be configurable during a setup stage or dynamically.

Figure 8:
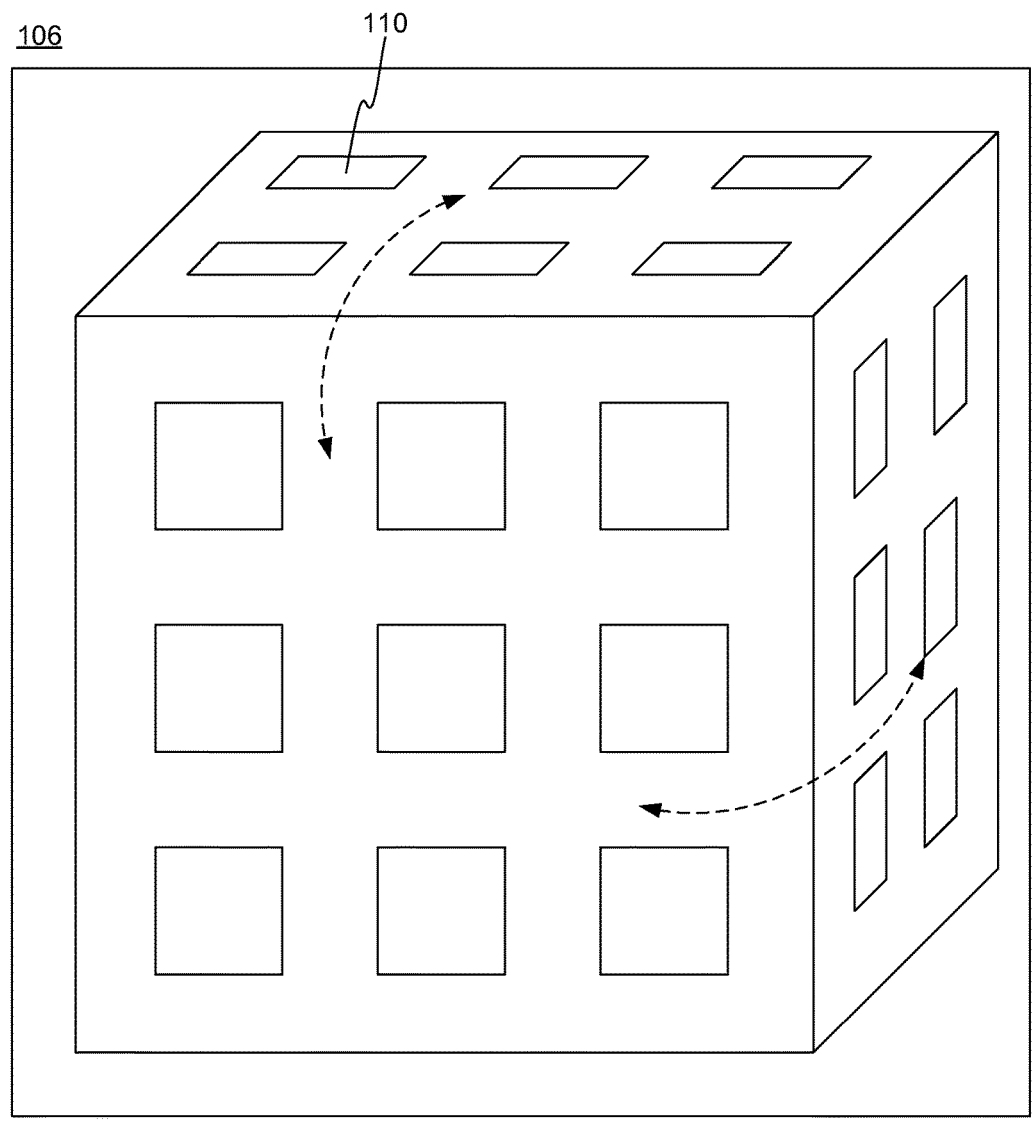
FIG. 8 shows a detailed view of a second user interface.

FIG. 8 shows a detailed view of the second user interface 106; another composite view. In this embodiment a parent or container cube contains multiple application icons 110 on each face. Icons 110 may be moved, copied, etc., between faces and/or other cubes (if multiple cubes are present). An icon can be activated to cause a transition either directly to the corresponding application (two-dimensional) or to a corresponding application cube. FIG. 9 shows another implementation of second user interface 106. With this embodiment, a parent cube 220 acts as a container with child cubes 222 on or near its faces. The parent cube 220 may be rotated and manipulated as a cube as described above. Contained sub-cubes might also rotate synchronously as the larger cube rotates, thus allowing an effect such as keeping the same sub-cube faces facing toward the user as the containing larger cube rotates. The child or sub-cubes 222 may be rotated and interacted with as a whole or individually.

Figure 10:
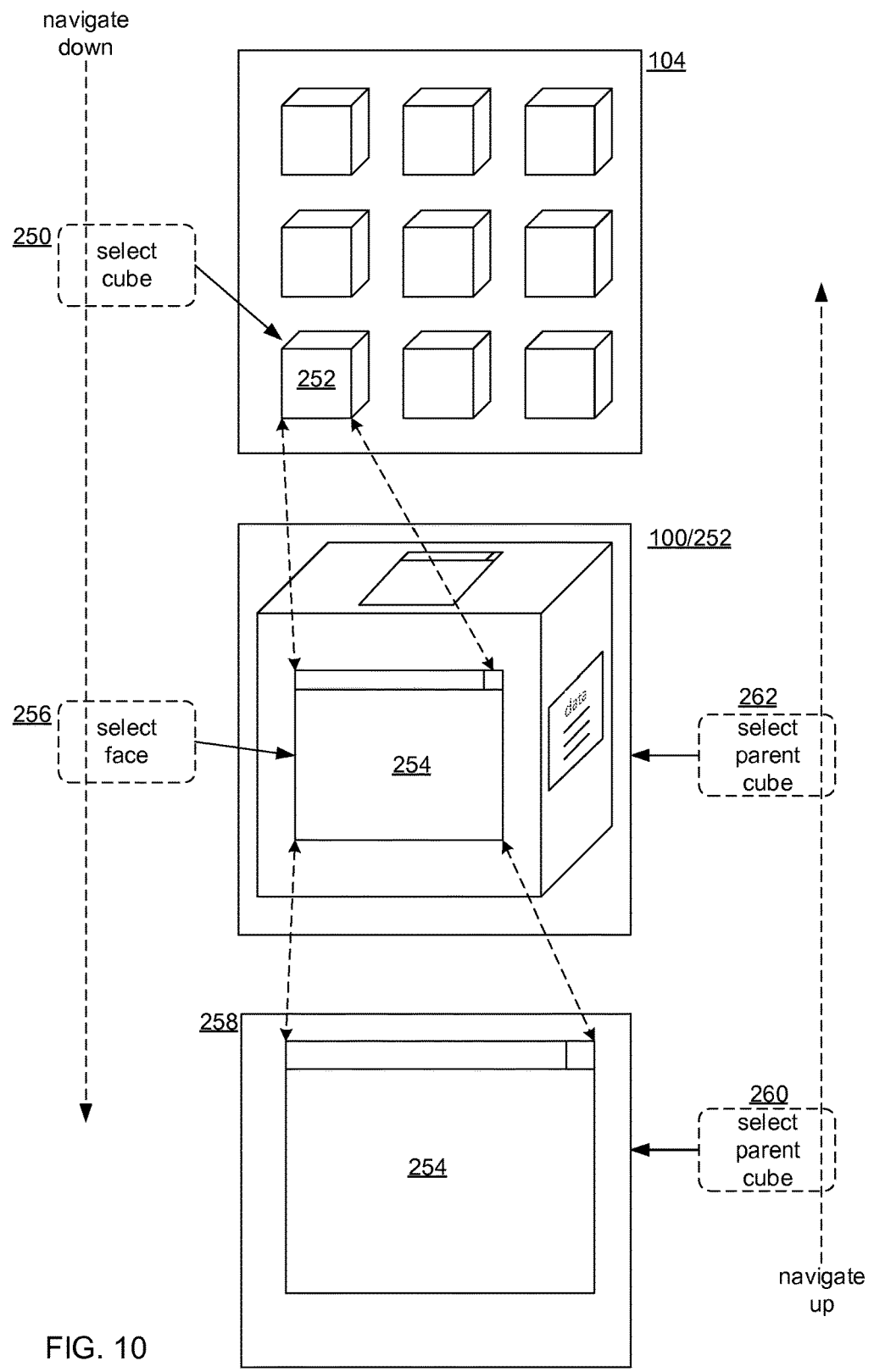
FIG. 10 shows an embodiment for hierarchical nesting and navigation.

FIG. 10 shows an embodiment for hierarchical nesting and navigation. It may be assumed that information is maintained that provides a hierarchical arrangement (nesting) of cubes (a hierarchy of container-contained relationships). For example, the first user interface 104 acts as a root view with cubes 100/102 contained therein (the root view might also be another type of composite view described herein). Note that the user interface 104, instead of being a root view, might be a child of another composite view. A user navigates down the hierarchy by a first input 250 to select a cube 252. The cube 252 is then transitioned into view (e.g., by an animation zooming in and centering the selected cube 252). When a face 254 is selected with a second input 256, the corresponding application 258 becomes the active view. Similarly, the user interface can be navigated back up the hierarchy. From the view of the application 258, a third input 260 transitions the view to the cube 252, and a fourth input 262 transitions the view from the cube 252 to the first user interface 104. Navigation may also be from cube to cube, using corresponding user inputs. For example, a user may navigate in turn from one cube to a logical next cube, with corresponding graphical transitions.

In one embodiment, the depth of possible interactivity can vary. In other words, what entities the user can interact may vary. For example, an application icon may be a miniaturized thumbnail of the actual application and the user can direct input directly to the underlying application through its icon. This approach may be used whether the application icon is shown in a single cube view or a composite view of cubes.

In another embodiment, if an application has only one user interface element such as a main window (no sub-applications), the application is displayed in ordinary two-dimensional fashion. If the application happens to create sub-applications while executing, the user interface can automatically transition to a cube view with a new face for the sub-application.

Regarding dynamic adding of cubes and faces, an embodiment may be used where the number of faces of a volume changes dynamically. Faces may be added while morphing the volume into a new polyhedron or other shape. Also, cubes may be dynamically grown and shrunk to accommodate new icons for applications or sub-applications. Moreover, cubes or their faces may be resized manually by the user.

While the act of dragging or copying icons between faces and cubes has been discussed, a user interface may also be designed to allow a user to move/copy cube faces per se between cubes.

While navigation is generally controlled by user input, device events such as incoming phone calls, software updates, alarms, and others can trigger navigation events to bring particular faces or cubes to the fore.

Another embodiment may involve saving the state of one or more cubes to a network resource such as a cloud, a web service, etc. The state of a cube and its corresponding application state can be captured and stored on a network resource. State may include information about which applications or sub-applications are associated with which cubes and/or cube faces, what state the applications are in, what documents or other application data are in use, and so forth. The state of a cube stored in a network cloud may also be loaded on another device, thus allowing mirroring or reproduction of the cube from device to device.

In a further embodiment, user interactivity with a cube simultaneously controls an application executing in association with the cube. For example, a cube for a video application may have video clips playing on respective faces. As the user rotates from face to face, only the video clip in the currently front-facing or active face is played, while video clips in other of the faces enter a buffering state. In another example, a mapping program may have faces that are active or dormant according to whether the faces are in focus or are currently displayed.

CONCLUSION

Embodiments and features discussed above can be realized in the form of information stored in volatile or non-volatile computer or device readable storage media. As used herein, "media" or "medium" is deemed to exclude energy, signals, carrier waves, and the like. These terms are deemed to include at least media such as optical storage (e.g., compact-disk read-only memory (CD-ROM)), magnetic media, flash read-only memory (ROM), or any current or future means of storing digital information with physical material. The stored information can be in the form of machine executable instructions (e.g., compiled executable binary code), source code, bytecode, or any other information that can be used to enable or configure computing devices to perform the various embodiments discussed above. This is also deemed to include at least volatile memory such as random-access memory (RAM) and/or operating system virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A computing device comprising:
a processor;
a display displaying a three-dimensional user interface modeled and rendered by the processor, the user interface comprising:
a plurality of interactive three-dimensional graphic shapes, each three-dimensional graphic shape comprised of a plurality of faces having respective graphics corresponding to and representing applications on the computing device, wherein each three-dimensional graphic shape is rotatable to alternatively display any of its faces as a respective current frontward face, wherein the current frontward face of each respective three-dimensional graphic shape comprises a face to which user input is able to be directed to invoke and display an application represented by the graphic displayed for the current frontward face; and
a storage device storing instructions configured to cause the processor of the computing device to perform a process comprising:
receiving user rotation inputs directed to the three-dimensional graphic shapes and in response interactively displaying rotation of the corresponding three-dimensional graphic shapes according to the user rotation inputs, each rotation in response to a rotation input changing the frontward face of the corresponding three-dimensional graphic shape; and
receiving system events while displaying the three-dimensional graphic shapes, the system events generated in the background while displaying the three-dimensional graphic shapes, and responding to the system events by, while continuing to display the three-dimensional graphic shapes, displaying automatic rotation of faces corresponding to the system events of the three-dimensional graphic shapes to become the current frontward faces of corresponding three-dimensional graphic shapes, wherein the system events do not correspond to user interactions with the computing device, and wherein, when a system event is received:
identify one of the applications as corresponding to the system event, and based thereon delivering the system event to the identified application, wherein the identified application is configured to receive and handle the system event,
based on the application having been identified as corresponding to the system event, select a face on the basis of the face containing the identified application, and
based on selection of the face, one of the three-dimensional graphic shapes containing the selected face is rotated to cause the selected face to be the frontward facing face of the three-dimensional graphic shape.

2. A computing device according to claim 1, wherein an application comprises elements and a three-dimensional graphic shape corresponding to the application comprises faces for the respective elements, and for whichever of the faces of the three-dimensional graphic shape is the current frontward face, interaction therewith by the user causes the corresponding application element to be activated and displayed.

3. A computing device according to claim 1, wherein the three-dimensional user interface comprises a graphical user shell for interactively activating and deactivating the applications.

4. A computing device according to claim 1, wherein the faces of a three-dimensional graphic shape comprise respective polygons, the three-dimensional graphic shape comprises a polyhedron, and the three-dimensional user interface enables the user to interactively rotate the polyhedron.

5. A computing device according to claim 4, wherein, automatically or by user input, the polyhedrons dynamically increase and decrease in number of sides, or the number of faces of the polyhedron dynamically increases and decreases.

6. A computing device according to claim 1, wherein the three-dimensional user interface enables the user to interactively attach or detach arbitrary applications on the computing device or elements thereof to the three-dimensional graphic shapes and/or the faces thereof.

7. A computing device according to claim 1, the process further comprising saving a state of a three-dimensional graphic shape to a network resource from which it becomes available for use on another computing device to configure a three-dimensional user interface on a second computing device communicating with the network resource.

8. Storage hardware storing information to enable a computing device to perform a process, the storage hardware not comprising a signal, the process comprising:
storing a plurality of applications on the storage hardware, each application having a corresponding graphic that can be interacted with by a user of the computing device to invoke the corresponding application;
displaying a user interface on a display of the computing device, the user interface comprising a plurality of interactive graphic shapes that when displayed portray three-dimensional volumes each comprised of a respective plurality of faces, each face comprised of a respective one of the graphics, each graphic shape having at least one rotatably changeable frontward facing face, wherein the user interface is configured to, while displaying the interactive shapes:
respond to rotation commands directed by a user of the computing device to the graphic shapes displayed on the display by causing graphic three-dimensional rotations of the interacted-with graphic shapes to be displayed on the display and corresponding different faces to be displayed as frontward facing faces of the interacted-with graphic shapes;

respond to system events that do not correspond to user interactions with the computing device by determining which of the graphic shapes correspond to which of the system events and automatically displaying, on the display, graphic rotation of the graphic shapes to display the graphics that are determined to correspond to the system events, respectively, wherein the graphics are selected for display by automated rotation on the basis of the system events having been generated by or received by the applications corresponding to the graphics selected for display by automated rotation.

9. Storage hardware according to claim 8, wherein the system events comprise software updates, incoming messages, or alarms.

10. Storage hardware according to claim 8, wherein the faces of one of the graphic shapes comprise respective other of the graphic shapes.

11. Storage hardware according to claim 10, wherein the user interface is further configured to: respond to user input selecting a given face comprising a given graphic shape by displaying the given graphic shape.

12. Storage hardware according to claim 11, wherein the responding to the user input selecting the given face further comprises undisplaying the one of the graphic shapes.

13. Storage hardware according to claim 8, wherein the events comprise matches to a search.

14. Storage hardware according to claim 13, wherein graphic shapes having faces containing graphics corresponding to matches of the search are automatically graphically rotated on the display to have those faces become frontward facing faces.

15. Storage hardware according to claim 8, wherein the user interface is configured to enable the user to interactively assign user-designated graphics to user-designated faces.

16. A method performed by a computing device comprising processing hardware, a display, and storage hardware, the method comprising:

storing, by the storage hardware, applications and respective graphic representations thereof, the graphic representations interactively selectable to display the respectively corresponding applications;

displaying, by the display, a user interface, the user interface comprising interactively rotatable graphic user interface elements, wherein each graphic user interface element when displayed by the display portrays a three-dimensional shape comprised of a respective set of regions, at least some of the regions displaying respective icons representing corresponding applications, wherein windows of the applications are displayed responsive to user inputs directed to the corresponding regions of the graphic user interface elements;

responding to interactive user inputs associated with respective of the graphic user interface elements displayed on the display by the display portraying three-dimensional rotation of the associated three-dimensional shapes portrayed by the graphic user interface elements; and while displaying the graphic user interface elements, receiving events generated by respective of the applications, the events generated while displaying the graphic user interface elements, wherein when a given event from a given application is received, responding by automatically causing the display to portray three-dimensional rotation of the three-dimensional shape portrayed by the graphic user interface element corresponding to the given application, thereby causing a region of the graphic user interface element containing a graphic of the given application to be displayed by the display.

17. A method according to claim 16, wherein the events are not associated with or caused by user interactions with the applications that generated the events.

18. A method according to claim 16, wherein a graphic user interface element portrays rotation interactively according to a corresponding user input that controls rotation of the graphic user interface element, and wherein the graphic user interface element portrays rotation automatically according to an event associated an application associated with the user interface element.

19. A method according to claim 16, wherein an icon comprises an interactive element of a corresponding application, wherein, while displayed by a corresponding one of the graphic user interface elements, the icon enables user interaction with the corresponding application.

20. A method according to claim 16, wherein the icon comprises an application window of the corresponding application.

* * * * *